United States Patent [19]

Perez

[11] Patent Number: 5,474,727
[45] Date of Patent: Dec. 12, 1995

[54] METHOD OF MANUFACTURING A POLYTETRAFLUOROETHYLENE TAPE

[75] Inventor: Sophie Perez, Montmirail, France

[73] Assignee: Axon Cable, Montmirail, France

[21] Appl. No.: 167,999

[22] PCT Filed: Jun. 19, 1992

[86] PCT No.: PCT/FR92/00560

§ 371 Date: Dec. 21, 1993

§ 102(e) Date: Dec. 21, 1993

[87] PCT Pub. No.: WO93/00213

PCT Pub. Date: Jan. 7, 1993

[30] Foreign Application Priority Data

Jun. 21, 1991 [FR] France ................................ 91 07683

[51] Int. Cl.⁶ ............................ B29C 55/04; B29C 67/20
[52] U.S. Cl. ....................... 264/154; 264/288.8
[58] Field of Search ......................... 264/41, 127, 154, 264/235.6, 288.8, DIG. 47; 526/255; 428/910

[56] References Cited

U.S. PATENT DOCUMENTS

| | | | |
|---|---|---|---|
| 3,953,566 | 4/1976 | Gore | 264/505 |
| 4,110,392 | 8/1978 | Yamazaki | 264/127 |
| 4,707,314 | 11/1987 | Kawahigashi et al. | 264/127 |
| 4,710,331 | 12/1987 | Nobuo et al. | 264/41 |
| 4,902,423 | 2/1990 | Bacino | 210/500.36 |

FOREIGN PATENT DOCUMENTS 2025835  1/1980  United Kingdom .

OTHER PUBLICATIONS

Abstract of Japan 57–51,450 (Published Mar. 26, 1982).

*Primary Examiner*—Leo B. Tentoni
*Attorney, Agent, or Firm*—Graham & James

[57] ABSTRACT

A method of manufacturing a PTFE tape whose density is less than or equal to 0.3 g/cm³, the method being characterized in that a raw PTFE tape is subjected to a first step of stretching while being heated so as to reduce its density to within the range 0.7 g/cm³ to 0.30 g/cm³, after which at least one step is performed of the type including a stage during which the tape is stabilized without changing the state of the PTFE by being passed through an oven at a temperature and for a duration that are functions of the mass to be stabilized while keeping the tape under tension so that its density does not increase, followed by a stage of stretching under heating so that the density of the tape reaches a value lying in the range 0.2 g/cm³ to 0.12 g/cm³.

10 Claims, 8 Drawing Sheets

METHOD OF MANUFACTURING A POLYTETRAFLUOROETHYLENE TAPE

BACKGROUND OF THE INVENTION

1. Field of the Invention

The present invention relates to a method of manufacturing a polytetrafluoroethylene (PTFE) tape of very high porosity, to a porous tape obtained thereby, and to use thereof, in particular in a coaxial cable.

2. Description of the Related Art

Porous PTFE tapes already exist having a density of 0.2 grams per cubic centimeter ($g/cm^3$), which corresponds to a dielectric constant ($\epsilon$) of about 1.09.

Such PTFE tapes are manufactured by conventional stretching methods that include a single and continuous stretching step at temperatures that are well below the melting temperature (freezing point) of PTFE. Such methods encounter a density limit at about 0.3 $g/cm^3$. Thus, when stretching comes close to this value, the tape breaks.

To achieve lower densities, known methods use at least two successive stretching passes, that imply changes to the structure of the PTFE which goes from a state in which its degree of crystallinity is high to a state in which the amorphous fraction is preponderant.

This sudden change of state is caused by a sintering operation that is performed after the stretching operation and at a temperature close to the melting temperature (freezing point) of the raw PTFE tape.

The structure is locked in the amorphous state by a rapid cooling step.

It should be observed that the dielectric constant of PTFE is related to its porosity, its specific gravity, or its density by the equation $\epsilon=(1+d/3)/(1-d/12.6)$ where d is specific gravity.

In addition, the relationship between porosity P and specific gravity d (or density in $g/cm^3$) is the following:

$$P=(1.1-d/2)/1.1$$

Consequently, one of the major uses of said tape lies in providing insulating coatings for cables, in particular coaxial cables.

SUMMARY OF THE INVENTION

An object of the present invention is to prepare a PTFE tape of high porosity in simplified manner and having a density that is lower than that which has been obtained previously.

According to the invention, this object is achieved by a method of manufacturing a PTFE tape whose density is less than or equal to 0.2 $g/cm^3$, the method being characterized in that a raw PTFE tape is subjected to a first step of stretching while being heated so as to reduce its density to within the range 0.7 $g/cm^3$ to 0.30 $g/cm^3$, after which at least one step is performed of the type including a stage during which the tape is stabilized without changing the state of the PTFE by being passed through an oven at a temperature and for a duration that are functions of the mass to be stabilized while keeping the tape under tension so that its density does not increase, followed by a stage of stretching under heating so that the density of the tape reaches a value lying in the range 0.2 $g/cm^3$ to 0.12 $g/cm^3$.

According to an advantageous characteristic of the invention, the stretching passes comprise stretching in the travel direction of the tape.

According to another characteristic, the temperature of the stabilization stage lies in the range 150° C. to 250° C.

The invention also provides a porous PTFE tape having a crystalline structure whose density lies in the range 0.2 $g/cm^3$ to 0.12 $g/cm^3$.

The invention also relates to the use of the high porosity tape for coating a coaxial cable.

The method of the invention thus makes it simple to obtain a PTFE tape of high porosity with improved dielectric properties.

This simplification in the method is due in particular to the fact that the invention makes it possible to use as raw material, raw PTFE tapes regardless of the way in which they have been manufactured and regardless of the properties of their constituents (degree of crystallinity of the initial resin, grade of said resin, nature of the lubricants, . . .).

In addition, the method of the invention makes it possible to reduce dimensional variations in the tape due to stretching.

For the same total stretching ratio, i.e. ratio between the speed of the tape at the outlet of the stretching device to the speed of the tape at its inlet, the method of the invention thus makes it possible to obtain greater porosity or lower specific gravity than have been obtained with prior art methods, or else, for equal porosity or specific gravity it makes it possible to obtain variations in thickness and in length that are smaller than those of present day methods.

Advantageously, the tape of the invention is used as a coating that is insulating and lightweight, in particular for a coaxial cable, thus conferring faster signal propagation qualities thereto.

BRIEF DESCRIPTION OF THE DRAWINGS

The invention will be better understood on reading the following description accompanied by drawings in which.

DESCRIPTION OF THE PREFERRED EMBODIMENTS

FIGS. 1a to 1d show the behavior of tape, and in particular the variation in its specific gravity as a function of stretch ratio.

The curves of FIGS. 1a to 1d show the results of tests performed as summarized in Tables IIa and IIb. These test show that a lower limit on specific gravity or density occurs at around 0.3. This limit may be approached in a first manner by a method that comprises a single stretching pass performed continuously with considerable addition of heat up to the melting temperature of PTFE, i.e. by causing the PTFE to change state and thus change from a state in which its degree of crystallinity is high to a state in which the amorphous fraction is preponderant.

Another known method of approaching this limit consists in performing a series of successive stretching passes, generally at least three stretching passes, thereby enabling specific gravity to be reduced stepwise.

The method of the invention makes it possible to avoid this limit on specific gravity or density at a value of about 0.3 g/cm³ on stretching a raw PTFE tape, and it makes it possible to achieve densities as low as 0.12 g/cm³ without producing any change in the state of the PTFE which thus retains its degree of crystallinity and the dielectric properties that are related thereto.

According to the invention, as illustrated in the following examples and in FIGS. 3a, 3b, and 4, a tape of raw PTFE having a starting density of about 1.7 g/cm³ is initially subjected to a first stretching pass in which it passes over two sets of pulling members T1, T2 that are optionally heated and that are located respectively at the inlet to and at the outlet from an oven F1 whose temperature is not high enough to enable the tape to reach its melting point. This temperature is adjusted so that on leaving the oven F1, the tape has minimal resistance to lengthening. Its resistance to lengthening may be measured, for example, by means of a strain gauge mounted on the bearing of the pulling member T2 which is constituted, for example, by a drive wheel.

This first stretching pass makes it possible to achieve a density lying in the range 0.7 g/cm³ to 0.3 g/cm³. The next step consists in stabilizing the tape without changing its state, merely by passing it through an oven F2 at a temperature and for a length of time (or at a tape travel speed) that depend on the mass of the tape to be stabilized or on its length per unit mass, with mechanical tension being applied to its end to ensure that the density of the tape does not increase while it passes through the oven F2.

Figure 4:
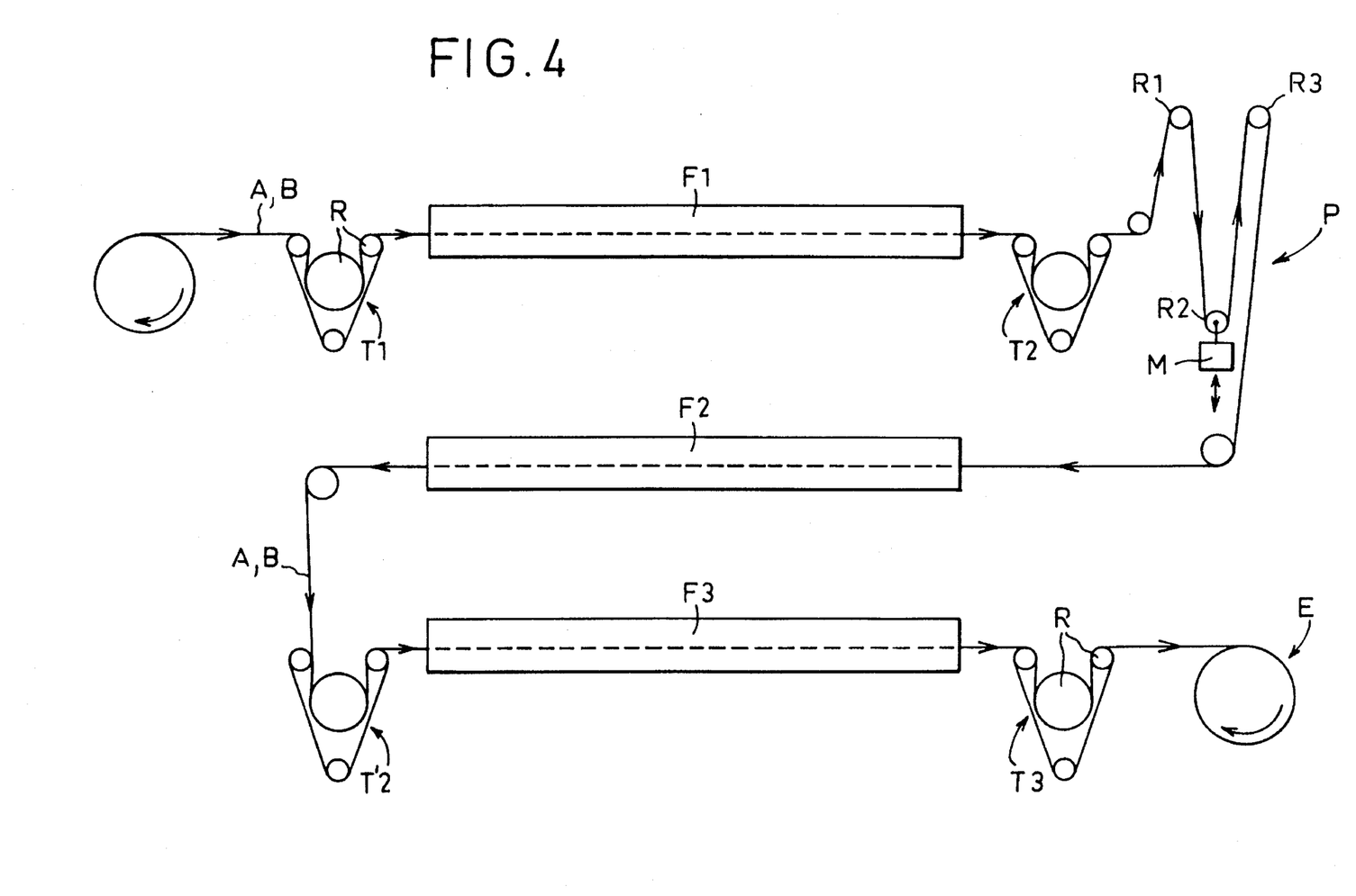
FIG. 4 is a diagrammatic illustration of the method of the invention.

The mechanical tension is obtained in particular by means of an adjustable tension accumulator P shown in FIG. 4.

This apparatus P serves to establish a reserve of tape in waiting suitable or compensating the speed difference between pulling stage T2 and pulling stage T'2.

The apparatus P comprises three rollers $R_1$-$R_2$-$R_3$.

The rollers $R_1$ and $R_3$ are stationary, whereas the roller $R_2$ is capable of moving vertically and is connected to a mass M.

The height difference h between the position of the rollers $R_1$ and $R_3$ and the position of the roller $R_2$ corresponds to a reserve supply of tape of length equal to $2h$.

The above disposition may be used in series depending on the length of the tape to be put into reserve.

The mass M generates a tension that is used for providing the mechanical component in the tape stabilization stage.

The temperature-duration product in the thermal component of the stabilization stage is, in fact, representative of the amount of heat energy applied per unit length (i.e. mass) of the tape.

Thereafter, a second stretching pass is performed by means analogous to those used during the first stretching pass, with the tape passing through an oven F3 whose temperature is determined using the same criteria as for its passage through F1.

Thus, in one or more successive steps of the stabilization/stretching type, it is possible to obtain a density of about 0.12 g/cm³ which corresponds to a porosity of 94.5% air and to a dielectric constant of about 1.04, without modifying the initial state of the PTFE.

The porous tape obtained in this way is then stored on a winder E situated at the end of the line.

Advantageously, the stretching passes are performed in the advance direction of the tape.

By means of the method of the invention which comprises stretching operations separated by respective stabilization stages, the degree of crystallinity of the PTFE is substantially conserved.

The following tests whose results appear in the tables show how the invention can be implemented.

Tables IA and IB show the influence of heating (temperature and duration, or applied heat energy) on the specific gravity of the tape obtained after a single stretching pass (for two tapes A and B of different sources or manufacture), with the duration of heating being proportional to the length of the oven(s) used, whereas the travel speed of the tape is substantially constant (see Table I).

Table II shows the existence of a bottom limit on tape stretching and thus on tape specific gravity or density that can be obtained in a single stretching pass, regardless of temperature (for two tapes A and B). From these tables it appears that the breaking limit for stretching ratios in the range 28 to 6 is situated at a density that generally lies in the range 0.2 g/cm³ to 0.6 g/cm³ (see Table II).

Table III shows the influence of temperature and of the number of stretching passes on the breaking limit (for two tapes A and B), and it can be seen that the limit tends to move down with increasing temperature or increasing number of stretching passes (see Table III).

Table IV shows the results obtained with a number of stretching passes lying in the range 1 to 4. It can be seen that the lowest breaking limit is obtained using two successive stretching passes (see Table IV).

From experiment and analysis of the tape in a thermomechanical analyzer, it turns out that the tape is stressed during a length of time after stretching under the effect of internal tension stresses. Experimentally, it has been found that applying heat makes it possible to reduce the time during which the tape is stressed and to accelerate the disappearance of internal tensions. By applying heat in this way, it is possible to perform the second stretching pass under the same conditions as the first.

Figure 1A:
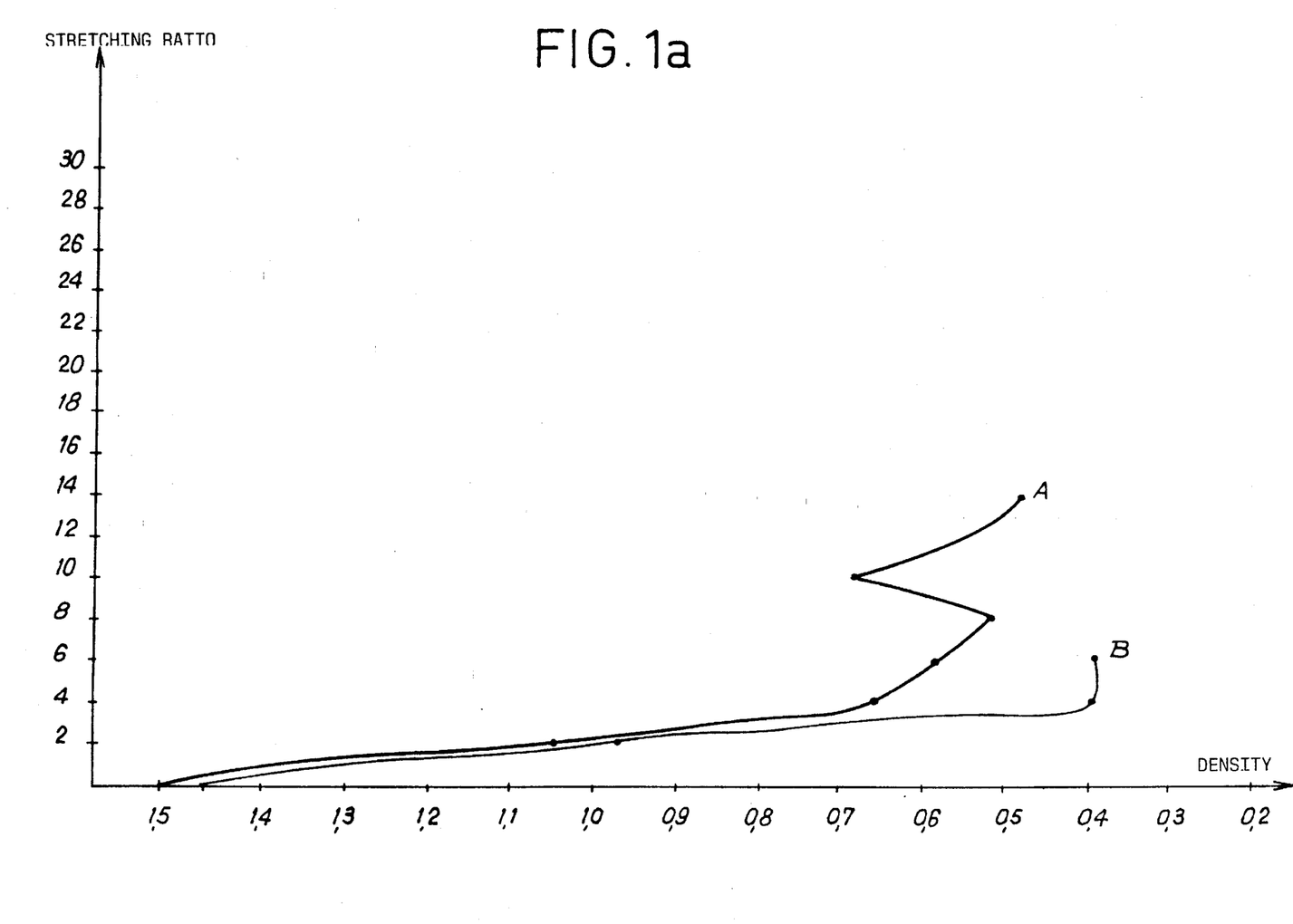
FIGS. 1a to 1d are curves giving stretching ratio as a function of specific gravity for a conventional stretching method over an average range of specific gravities.
Figure 1B:
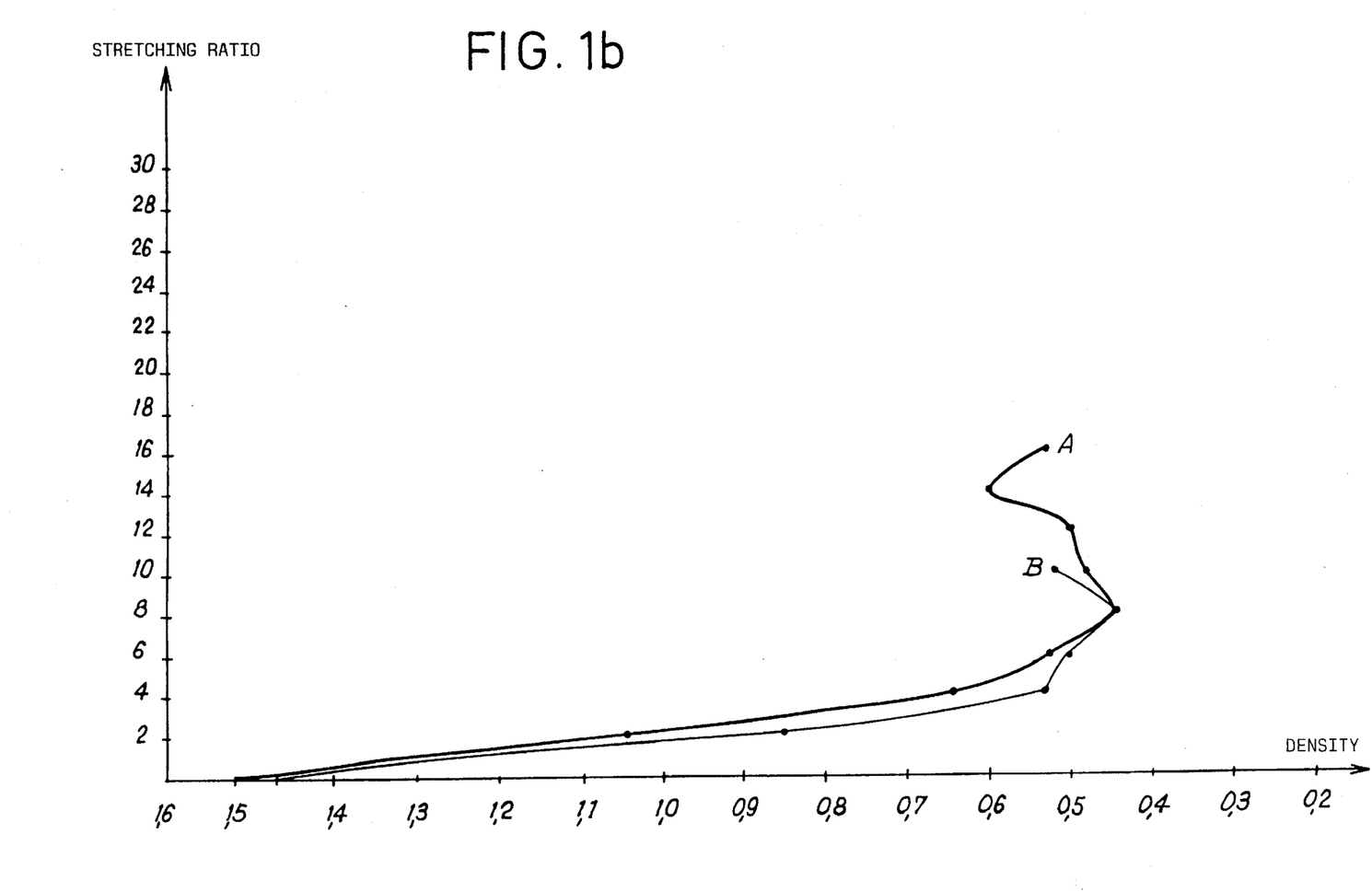
Figure 1C:
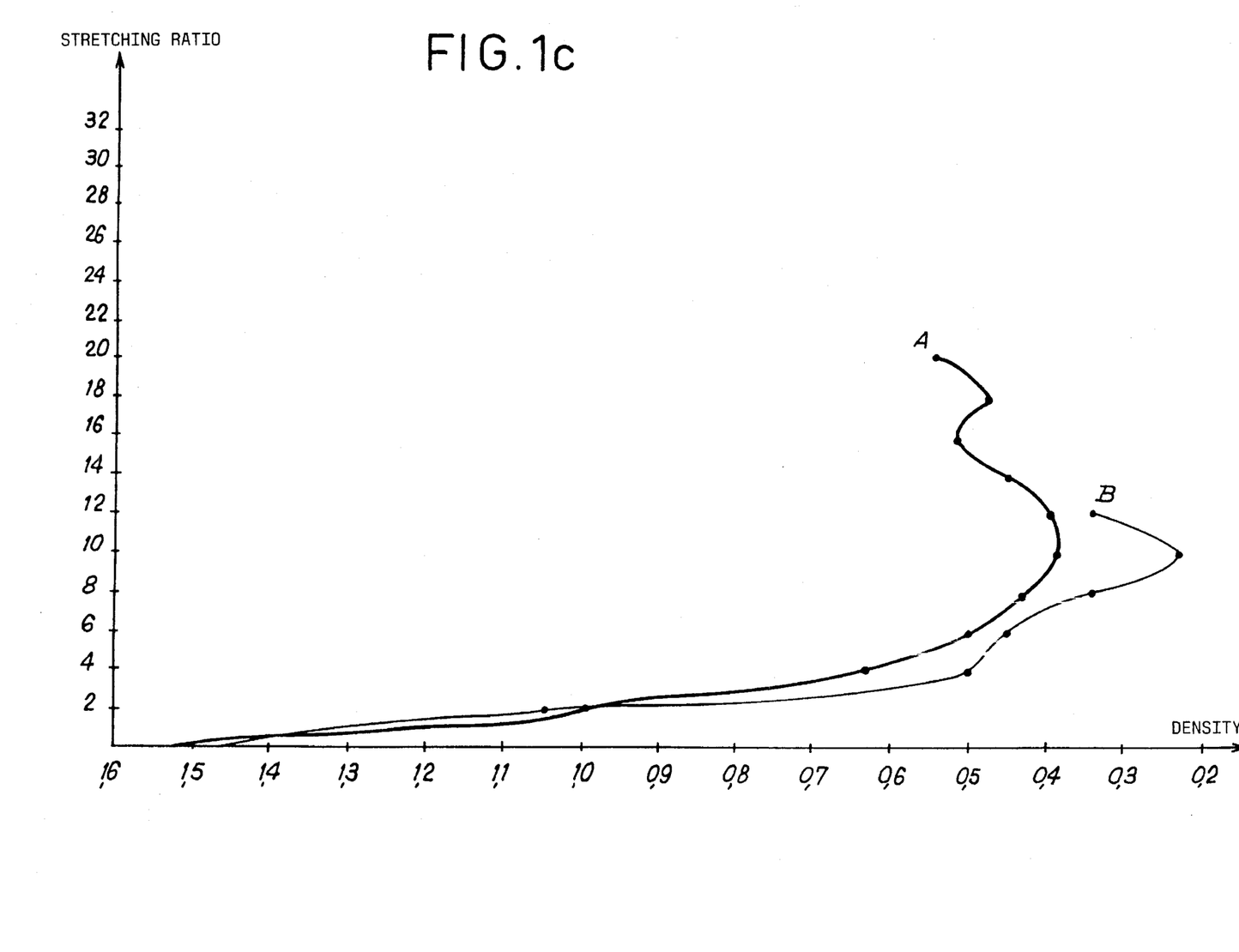
Figure 1D:
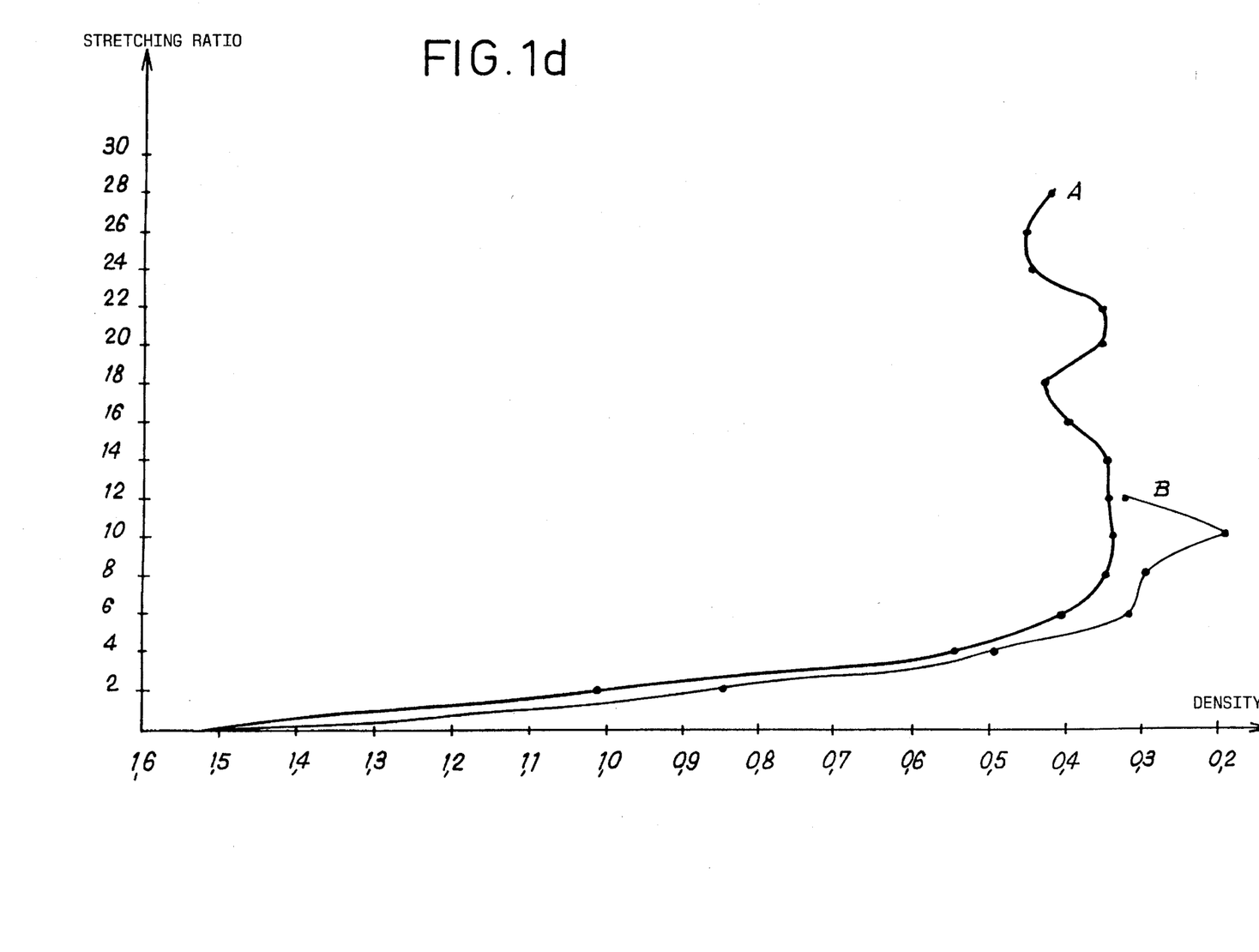
Figure 2:
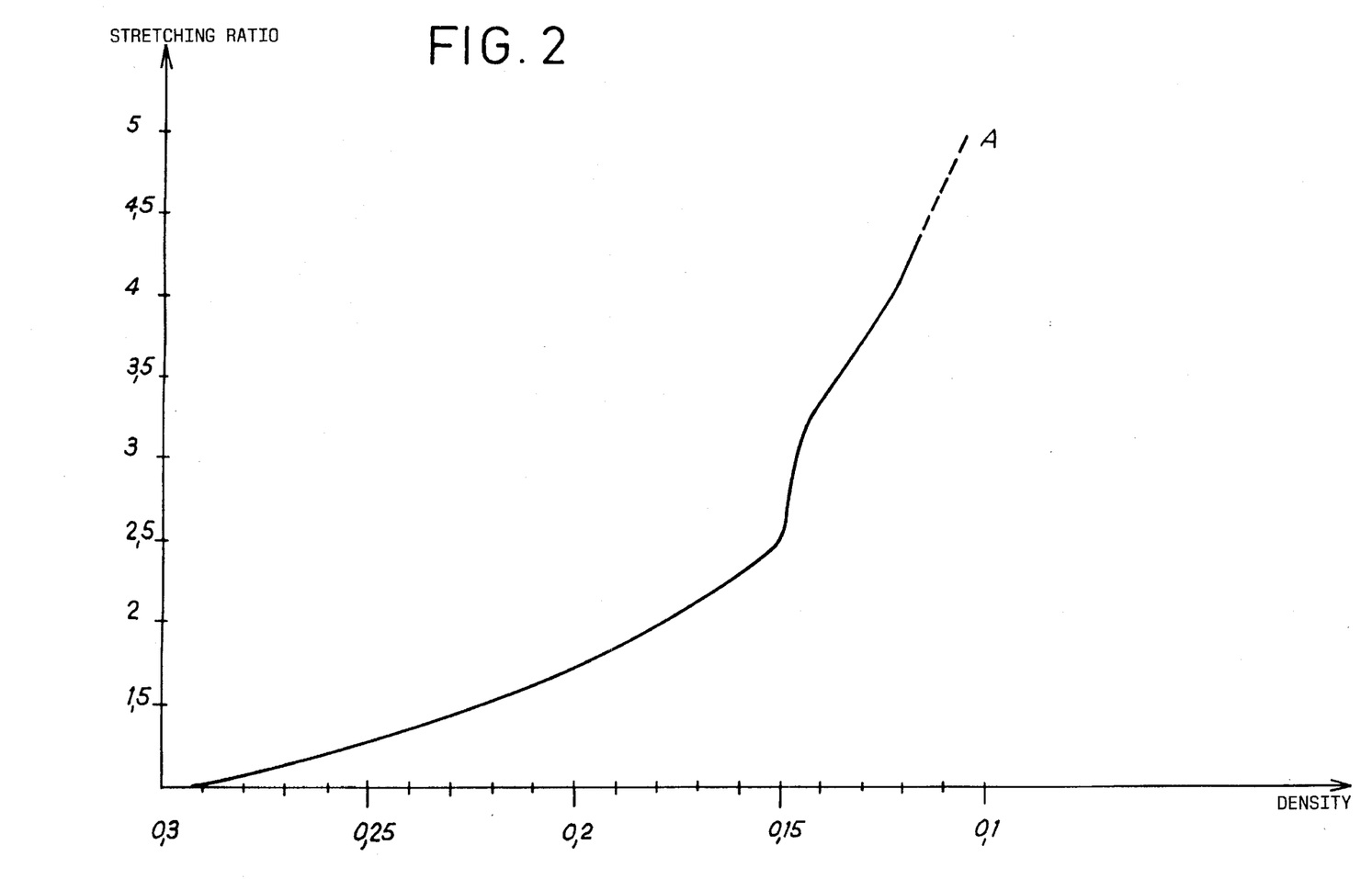
FIG. 2 is a curve showing stretching ratio as a function of specific gravity in a range of low specific gravities (less than 0.3) and in application of the method of the invention.
Figure 3A:
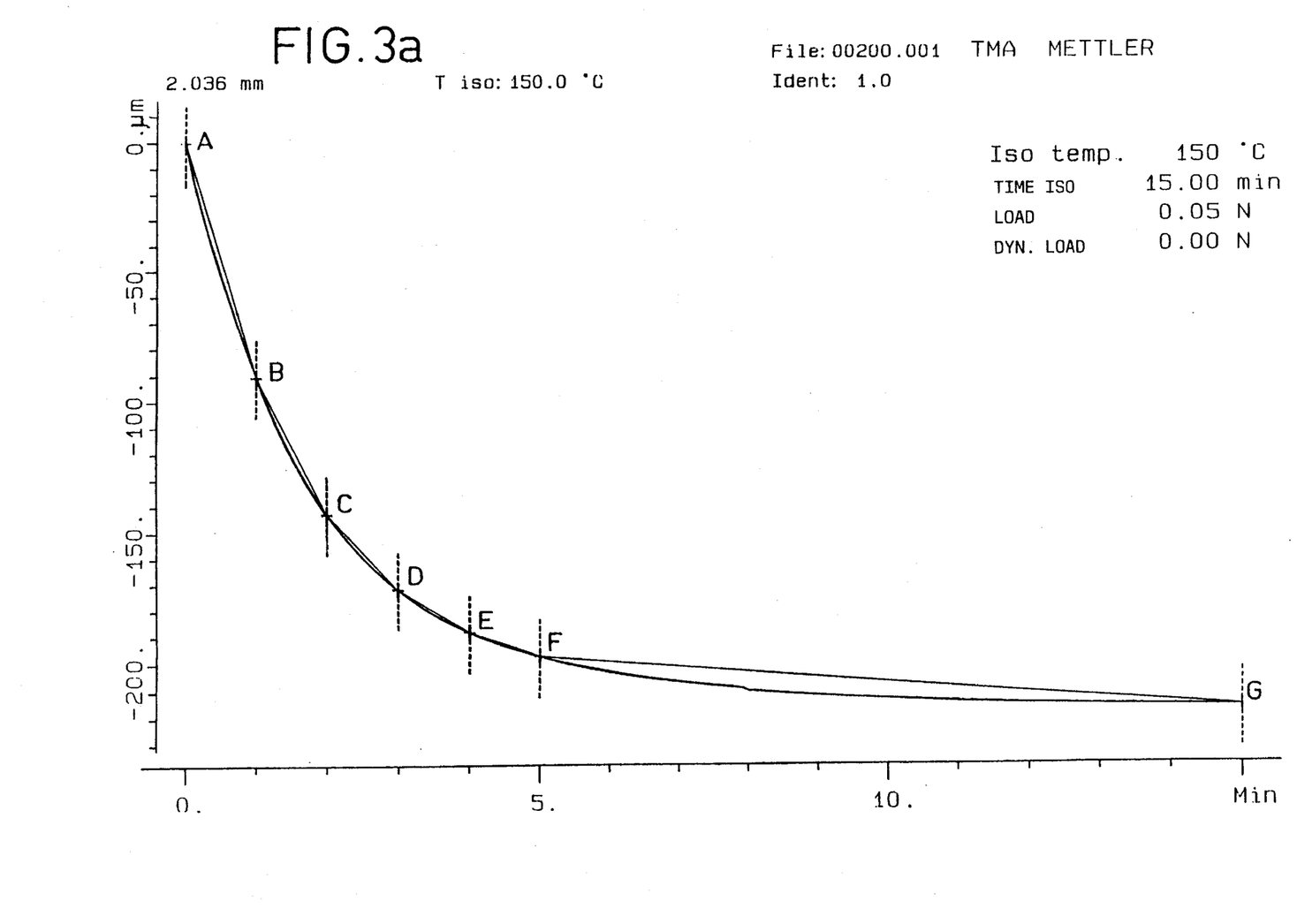
FIGS. 3a and 3b show two types of behavior in thermomechanical analysis of the tape after the stretching passes.
Figure 3B:
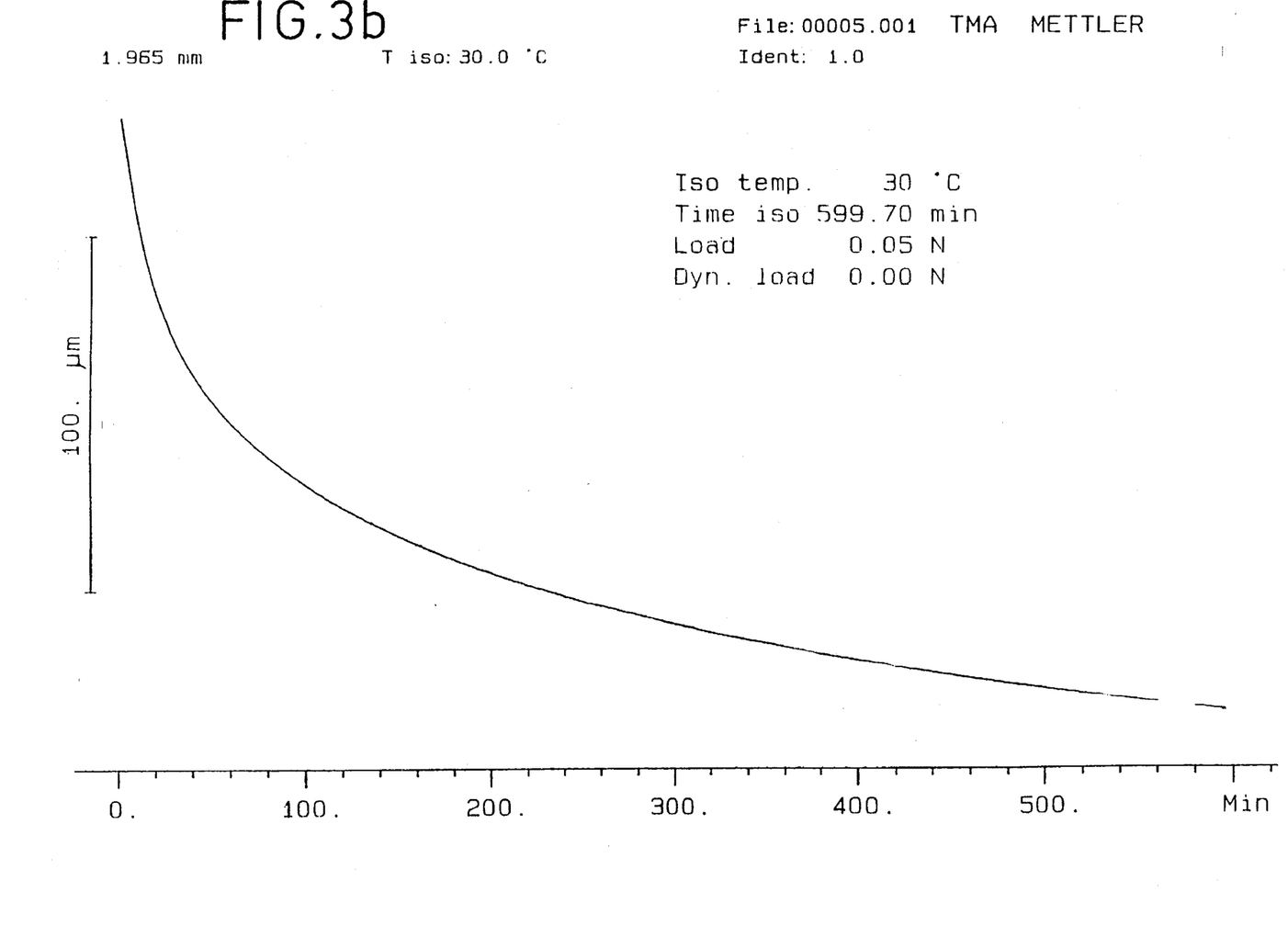

FIGS. 3a and 3b show the behavior of the tape after stretching when it has been subjected to the application of heat energy at temperatures respectively of 150° C. and of 30° C.

Table VIII shows the values of the shrinkage coefficient (obtained from the slope of the curve) at particular points on the curve.

Table IX shows shrinkage percentage values as a function of time at 150° C.

It can be seen that return to a state in which internal stresses are minimal is quicker at 150° C., with the efficiency of the method thus being improved by adding a stabilization stage in which heat energy is applied between two successive steps of stretching.

Table V shows the importance of keeping the tape under tension after the first step of stretching and during the heat treatment or stabilization stage.

It can be seen that when tension is maintained so that density does not increase during heat treatment, the final density or the breaking limit of the second stretching pass is lower, for given temperature, than in the absence of tension (see Table V).

Table VI shows the influence (using the same tape as in Table V) of temperature (or of heat application) during the intermediate stabilization stage with the tape tension and travel speed through the oven F2 or the heating duration being kept constant.

The best result is obtained around 175° C. (see Table VI).

Table VII summarizes the influence of various factors on the density or the specific gravity of the tape after various different stretching modes have been applied thereto (see Table VII) with or without stabilization.

Example VIIe-4 gives the best result, with a final density of 0.12 g/cm$^3$.

TABLE I

Tape B   $d_o = 1.58$

| Stretch ratio $V_2/V_1$ | Oven length L | | | | | |
|---|---|---|---|---|---|---|
| | 1 m | 2 m | 1 m | 2 m | 1 m | 2 m |
| | Temperature T | | | | | |
| | 100° C. | 100° C. | 125° C. | 125° C. | 150° C. | 150° C. |
| 5/1 | 0.47 | 0.39 | 0.41 | 0.37 | 0.365 | 0.36 |
| 7.5/1 | 0.36 | 0.27 | 0.39 | 0.28 | 0.31 | 0.25 |
| 10/1 | break | 0.32 | 0.38 | 0.29 | 0.30 | 0.27 |

Tape A   $d_o = 1.52$

| Stretch ratio | Oven length L 2 m Temperature T 125° C. |
|---|---|
| 2.5/0.5 | 0.52 |
| 3.5/0.5 | 0.50 |
| 5/0.5 | 0.38 |

TABLE IIA

Tape A   $d_o = 1.52$

| Stretch ratio | Oven length | | | |
|---|---|---|---|---|
| | 2 m | 2 m | 2 m | 2 m |
| | Temperature | | | |
| | 125° C. | 150° C. | 175° C. | 200° C. |
| 2/1 | 1.05 | 1.04 | 0.99 | 1.01 |
| 4/1 | 0.66 | 0.64 | 0.63 | 0.54 |
| 6/1 | 0.594 | 0.53 | 0.50 | 0.41 |
| 8/1 | 0.518 | 0.45 | 0.43 | 0.35 |
| 10/1 | 0.68 | 0.48 | 0.38 | 0.34 |
| 12/1 | 0.48 | 0.502 | 0.39 | 0.35 |
| 14/1 | break | 0.597 | 0.45 | 0.35 |
| 16/1 | | 0.53 | 0.52 | 0.40 |
| 18/1 | | break | 0.45 | 0.43 |
| 20/1 | | | 0.52 | 0.36 |
| 22/1 | | | break | 0.36 |
| 24/1 | | | | 0.45 |
| 26/1 | | | | 0.46 |
| 28/1 | | | | 0.42 |
| 30/1 | | | | break |

TABLE IIB

Tape B

| 2 m 125° C. | 2 m 150° C. | 2 m 175° C. | 2 m 200° C. | Stretch ratio $d_o = 1.58$ |
|---|---|---|---|---|
| 0.97 | 0.86 | 1.04 | 0.84 | 2/1 |
| 0.53 | 0.53 | 0.50 | 0.49 | 4/1 |
| 0.39 | 0.48 | 0.45 | 0.32 | 6/1 |
| 0.39 | 0.44 | 0.34 | 0.30 | 8/1 |
| break | 0.52 | 0.23 | 0.19 | 10/1 |
| | break | 0.32 | 0.33 | 12/1 |
| | | break | break | 14/1 |

TABLE III

| Stretch ratio | Oven length | |
|---|---|---|
| | 2 m | 2 m |
| | Temperature | |
| | 125° C. | 150° C. |
| 1 stretch pass 5/1 | 0.41 | 0.37 |
| 2 stretch passes 2.5/1 + 2/1 | 0.37 | 0.37 |
| 1 stretch pass 7.5/1 | 0.39 | 0.31 |
| 2 stretch passes 2.5/1 + 3/1 | 0.30 | 0.27 |
| 1 stretch pass 10/1 | 0.38 | 0.30 |
| 2 stretch passes 2.5/1 + 4/1 | 0.26 | 0.26 |
| 1 stretch pass 12.5/1 | 0.32 | 0.31 |
| 2 stretch passes 2.5/1 + 5/1 | 0.24 | 0.23 |
| 1 stretch pass 15/1 | break | — |

TABLE IV

Tape $d_o = 1.67$

| Stretch ratio | Oven length | | |
|---|---|---|---|
| | 2 m | 2 m | 2 m |
| | Temperature | | |
| | 175° C. | 150° C. | 125° C. |
| 1 stretch pass 12/1 | 0.40 | — | — |
| 2 stretch passes 6/1 + 2/1 | 0.36 | — | — |
| 2 stretch passes 2/1 + 6/1 | 0.33 | — | — |
| 2 stretch passes 4/1 + 3/1 | break | — | — |
| 2 stretch passes 3/1 + 4/1 | 0.28 | — | — |
| 3 stretch passes 3/1 + 2/1 + 2/1 | 0.33 | — | — |
| 4 stretch passes 2/1 + 2/1 + 2/1 + 1.5/1 | — | 0.39 | — |
| 3 stretch passes 3/1 + 2/1 + 2/1 | — | — | 0.40 |
| 4 stretch passes 2/1 + 2/1 + 2/1 + 1.5/1 | — | — | 0.45 |

TABLE V

Stabilization tensions
$d_o = 1.50$
Oven length 2 m
Temperature 125° C.

| Steps | Stretch ratio | Zero | Medium | High | Very high |
|---|---|---|---|---|---|
| 1st stretch pass | 3/1 | 0.56 | 0.66 | 0.62 | 0.63 |
| Stabilization | — | 0.68 | 0.65 | 0.61 | 0.33 |
| 2nd stretch pass | 3/1 | 0.30 | 0.27 | 0.27 | 0.27 |

TABLE VI

Stabilization temperature/speed
Initial tape identical to Table V under tension

| Steps | 2 m/150° C. 4 m/min | 2 m/175° C. 6 m/min | 2 m/200° C. 8 m/min |
|---|---|---|---|
| 1st stretch pass 3/1 | 0.74 | 0.64 | 0.66 |
| Stabilization | 0.63 | 0.52 | 0.52 |
| 2nd stretch pass 3/1 | 0.26 | 0.22 | 0.24 |

TABLE VII

| Example | 1st stretch pass 2 m/175° C. | Specific gravity | Stabilization speed | Oven length temp. | Specific gravity | 2nd stretch pass 2 m/175° C. | Final specific gravity |
|---|---|---|---|---|---|---|---|
| a1 | 5/1 | 0.44 | | | | 2.5/1 | 0.21 |
| a2 | " | " | Stabilization ambient air 5 h | | | 2.9/1 | break at 0.19 |
| a3 | " | " | Stabilization ambient air 5 h | | | 2.9/1 | break at 0.18 |
| b1 | 5/1 | 0.42 | 1 m/min | 2 m 175° C. | 0.36 | 2.6/1 | 0.19 |
| b2 | " | " | " | 2 m 175° C. | " | 2.9/1 | break at 0.16 |
| c1 | 7/1 | 0.31 | | | | 2.5/1 | 0.19 |
| c2 | " | " | | | | 3/1 | break |
| c3 | " | " | 1 m/min | 2 m 175° C. | 0.40 | 2.5/1 | 0.16 |
| c4 | " | " | " | 2 m 175° C. | " | 3/1 | 0.16 |
| c5 | " | " | " | 2 m 175° C. | " | 3.5/1 | break at 0.15 |
| d1 | 8/1 | 0.312 | | | | 3/1 | 0.18 |
| d2 | | | | | | 3.5/1 | break |
| d3 | " | " | | | | 2.5/1 | 0.17 |
| d4 | " | " | | | | 3/1 | 0.13 |
| d5 | " | " | | | | 3.5/1 | unmeasurable |
| e1 | 8/1 | 0.293 | 1 m/min | 2 m 175° C. | 0.235 | 2/1 | 0.16 |
| e2 | " | " | " | 2 m 175° C. | " | 2.5/1 | 0.15 |
| e3 | " | " | " | 2 m 175° C. | " | 3.1/1 | 0.14 |
| e4 | " | " | " | 2 m 175° C. | " | 4.1/1 | 0.12 |
| e5 | " | " | | | | 4.6/1 | unmeasurable |
| e6 | " | " | | | | 2.5/1 | 0.18 |
| e7 | " | " | | | | 3/1 | break |

TABLE VIII

Initial length of sample 2.036 mm

| Point on curve | Shrinkage coefficient (ppm/s) |
|---|---|
| A | −7790.7 |
| B | −583.8 |
| C | −257.2 |
| D | −136.8 |
| E | −76.2 |
| F | −15.9 |
| G | — |

TABLE IX

| % shrinkage | Time (min) |
|---|---|
| 10% | 1.18 |
| 30 | 1.61 |
| 50 | 2.18 |
| 70 | 3.06 |
| 90 | 4.86 |

I claim:

1. A method of manufacturing a PTFE tape whose density is less than or equal to 0.2 g/cm$^3$, the method being characterized in that a raw PTFE tape is subjected to a first step of stretching while being heated so as to reduce its density to within the range 0.7 g/cm$^3$ to 0.30 g/cm$^3$, after which at least one step is performed of the type including a stage during which the tape is stabilized at a state of the PTFE at which its degree of crystallinity is high by being passed through an oven at a temperature and for a duration that are functions of the mass to be stabilized while keeping the tape under tension so as to preclude an increase in density of said tape, followed by a stage of stretching under heating so that the density of the tape reaches a value lying in the range 0.2 g/cm$^3$ to 0.12 g/cm$^3$.

2. A manufacturing method according to claim 1, characterized in that the stretching passes comprise stretching in the travel direction of the tape.

3. A method according to claim 1, characterized in that the temperature of the stabilization stage lies in the range 150° C. to 250° C.

4. A method according to claim 1, characterized in that the duration of passage through the stabilization oven lies in the range 5 seconds to 2 minutes.

5. A method according to claim 3, characterized in that the temperature is 175° C.

6. A method according to claim 1, characterized in that a single step of thermal stabilization/stretching is performed.

7. A method according to claim 1, characterized in that the stretching ratio for the stretching of the first step lies in the range 5/1 to 20/1.

8. A method according to claim 1, characterized in that the stretching ratio for the stretching of the first step is 8/1.

9. A method according to claim 1, characterized in that the stretching ratio for the stretching of the second step is 4/1.

10. A method according to claim 4, characterized in that the duration is 2 minutes.

* * * * *